US006951987B1

(12) United States Patent
Hansen et al.

(10) Patent No.: US 6,951,987 B1
(45) Date of Patent: Oct. 4, 2005

(54) HIGH VOLTAGE BUSHING

(75) Inventors: Peder M. Hansen, San Diego, CA (US); David B. Phillips, La Mesa, CA (US); Jose L. Chavez, Chula Vista, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 228 days.

(21) Appl. No.: 10/355,696

(22) Filed: Jan. 31, 2003

(51) Int. Cl.⁷ ............................................. H02G 15/00
(52) U.S. Cl. .................. 174/142; 174/137 R; 174/155; 174/75 D
(58) Field of Search ............................ 174/100, 137 R, 174/138 R, 138 D, 138 F, 142, 140 H, 148, 152 R, 152 G, 154, 155, 75 D

(56) References Cited

U.S. PATENT DOCUMENTS

| | | |
|---|---|---|
| 1,304,283 A | 5/1919 | Eby |
| 2,732,419 A | 1/1956 | Wilson |
| 3,028,568 A | 4/1962 | Camilli |
| 3,299,383 A | 1/1967 | Conner et al. |
| 3,430,116 A | 2/1969 | Johnstone |
| 3,662,082 A * | 5/1972 | Heppner ....................... 174/18 |
| 3,686,600 A | 8/1972 | Conner et al. |
| 4,169,037 A | 9/1979 | Cole, Jr. |
| 4,228,318 A * | 10/1980 | Selsing ....................... 174/73.1 |
| 4,296,274 A | 10/1981 | Cookson |
| 4,362,897 A | 12/1982 | Matthaus et al. |
| 4,387,266 A | 6/1983 | Matthaus |
| 4,760,216 A | 7/1988 | Thiel et al. |
| 4,847,450 A | 7/1989 | Rupprecht |
| 5,130,495 A * | 7/1992 | Thompson ................. 174/73.1 |
| 5,466,891 A | 11/1995 | Freeman et al. |
| 6,218,627 B1 | 4/2001 | Shindo et al. |
| 6,346,677 B1 | 2/2002 | Guillemette et al. |

* cited by examiner

*Primary Examiner*—Dean A. Reichard
*Assistant Examiner*—Jinhee Lee
(74) *Attorney, Agent, or Firm*—Michael A. Kagan; Peter A. Lipovsky; Celia A. Dunham

(57) ABSTRACT

A high voltage bushing includes an electrically conductive coupling having an aperture; first and second dielectric tubes mounted to the coupling so that they are coaxially aligned and have first and second ends, respectively; first and second end plates mounted in a fluid tight manner to the first and second ends of the first and second tubes, respectively; an electrically conductive ground shield mounted in the aperture, and having an inwardly profiled end for moderating an electric field along the bushing, and having second and third apertures; and a center conductor that extends through the second and third apertures of the ground shield, and is mounted to the first and second end plates.

14 Claims, 3 Drawing Sheets

HIGH VOLTAGE BUSHING

BACKGROUND OF THE INVENTION

Most high voltage bushings have one dielectric tube external to a building or container. Feed-through bushings that exit from a building often have a second dielectric tube internal to the building. The tubes are usually joined together by a coupling where the bushing passes through the building. Often the tubes are sealed and pressurized with air, nitrogen ($N_2$) or sulfur hexaflouride ($SF_6$) to increase the withstand voltage between a high voltage center conductor mounted in the bushing and the ground potential at the pont where they penetrate the building. The dielectric tubes are most commonly made out of fiberglass covered with silicon rubber materials.

There are many phenomena that limit the voltage and current that a particular bushing can handle. Some of these limits are flashover (internal or external), internal heating (current), and corona formation on the surface of the dielectric tubes. Corona is very hot plasma, and over the course of time, it can damage the surface or destroy the dielectric tube. The flashover and corona formation voltage on the portion of the bushing that is outside the building and exposed to the elements is dependent upon the environmental conditions. Wet conditions, typically from rain or condensation, are the worst case. In wet conditions, the voltages at which the deleterious phenomena occur are lower. For example, at a certain voltage under dry conditions, the bushing may be completely corona free, but corona can form on the surface of the external dielectric tube when the bushing becomes wet, as for example, when exposed to rain. The energy dissipated by corona is proportional to frequency and the potential for damage is exacerbated at radio frequency. For that reason, one of the critical design criteria for RF (VLF/LF) high voltage bushings is that there be no stationary corona on the surface of the dielectric tubes under spray wet conditions. Obviously, the portion of the bushing that is located inside of the building does not become wet and does not have to satisfy this criterion.

The formation of corona under spray-wet conditions is a function of the electric field strength on the surface of the dielectric tubes that come in contact with water drops. Consequently, one aspect of designing a high voltage bushing is to minimize the surface electric field on the surface of the external dielectric tube. For a simple bushing with a cylindrical center conductor and a cylindrical tube, the surface electric field on the external tube is smallest near the tip of the bushing, and is a maximum at the region of the bushing where the ground potential is located. The average electric field along the surface of the dielectric tube is equal to the voltage divided by the length of the tube. However, the maximum electric field at the grounded region of the bushing can be 5 to 10 times (or more) greater than the average electric field, depending upon the relative size of the hole through the building through which the bushing penetrates, and the diameter of the center conductor. In a typical composite bushing, there is a ring-shaped region, referenced as the "triple point," where three structures made of three different materials, the silicon rubber shed, the aluminum center flange, and the dielectric (fiberglass) tube, are coterminous. Typically, the "triple point" is the first region of the bushing likely to go into corona at a threshold electrical field intensity. It is common practice to shield the "triple point" region and the internal portion of the bushing where the center conductor passes through the conducting wall with an internal ground shield to moderate the electric field. Without the ground shield, the electric field would not be moderated at all, whereupon the external surface electric field would be heavily concentrated on the dielectric tube near the triple point region.

An optimum bushing design would have a uniform electric field along the surface of the external dielectric. Such an electric field would be equal to the voltage across the busing divided by the length of the dielectric tube. One way to achieve a uniform electric field is to have one or more floating conducting tubes of varying length to cause the fields to distribute nearly linearly over the surface of the dielectric tube. This approach has been used for 60 Hz high voltage bushings, but the methods used to insulate such floating tubes have associated technical difficulties and expense. For example, heating of the dielectric used to support the floating tubes in position can limit the temperature rise and hence the current limit of the busing. Perhaps more importantly, the floating tubes significantly increase the capacitance of the bushing, which is deleterious for RF antenna applications.

A need therefore exists for a high voltage bushing that overcomes the aforesaid technical difficulties and reduces the electric field in the region of the "triple point" to prevent the formation of corona when the bushing is wet.

SUMMARY OF THE INVENTION

A high voltage bushing includes an electrically conductive coupling having an aperture; first and second dielectric tubes mounted to the coupling so that they are coaxially aligned and have first and second ends, respectively; first and second end plates mounted in a fluid tight manner to the first and second ends of the first and second tubes, respectively; an electrically conductive ground shield mounted in the aperture, and having an inwardly profiled end for moderating an electric field along the bushing, and having second and third apertures; and a center conductor that extends through the second and third apertures of the ground shield, and is mounted to the first and second end plates.

BRIEF DESCRIPTION OF THE DRAWINGS

Throughout the several views, like elements are referenced using like references.

DESCRIPTION OF THE PREFERRED EMBODIMENT

Figure 1:
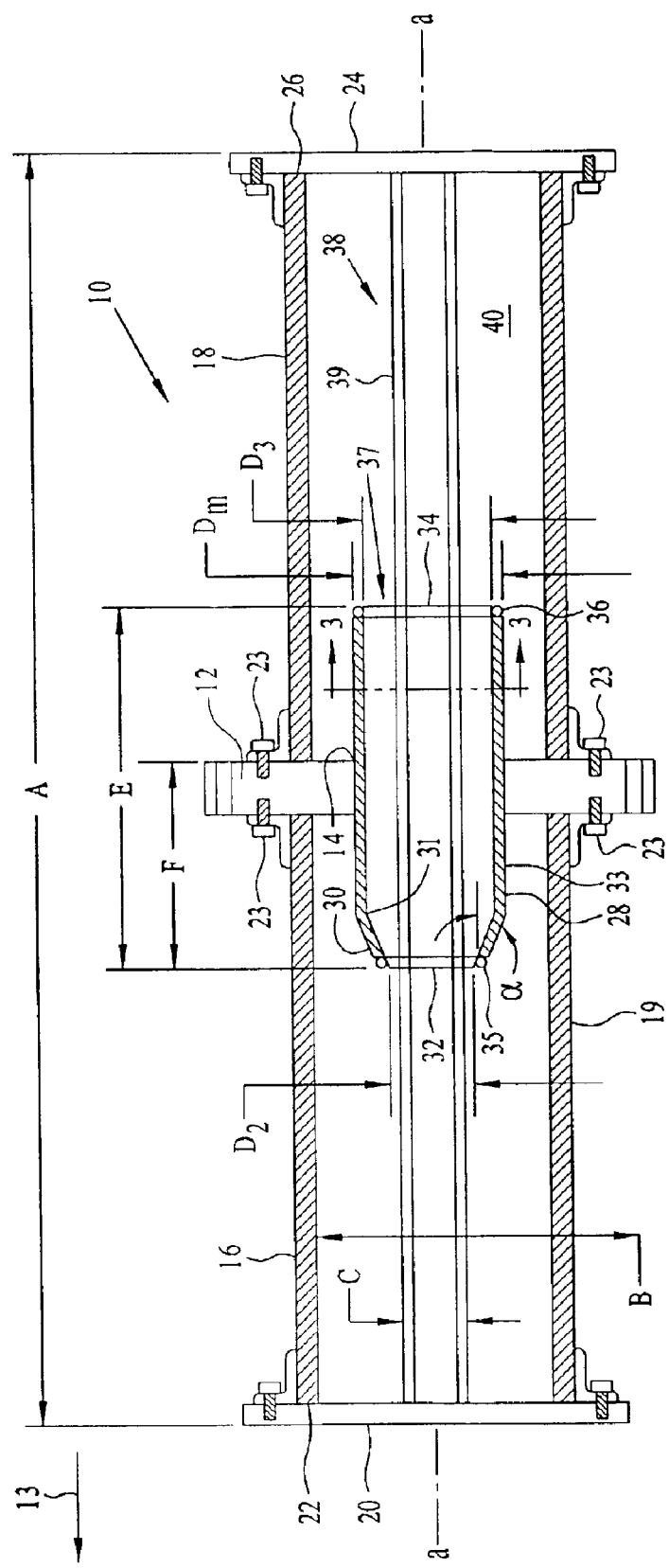
FIG. 1 shows a cross-sectional view of an embodiment of a high voltage bushing.
Figure 2:
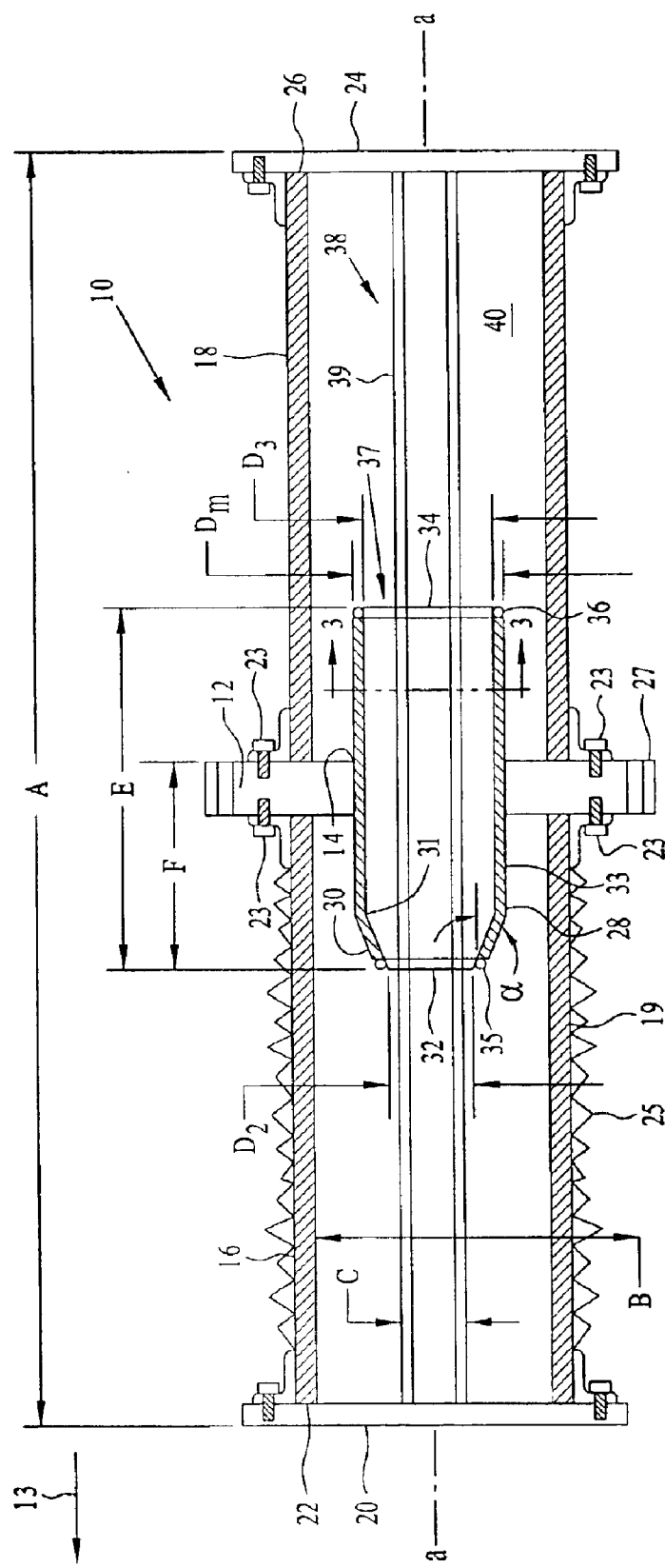
FIG. 2 shows an embodiment of a cross-sectional view of an embodiment of a high voltage bushing that includes a shed.

Referring to FIG. 1, there is shown a high voltage feed-through bushing 10, which may be used, for example, as the high voltage, high current connection to a high power radio broadcast antenna. In one embodiment, arrow 13 points upwardly towards the sky (not shown). Feed-through bushing 10 may carry high voltage and current on center conductor 38 which may be of an electrically conductive material fabricated, for example, from copper, steel, or aluminum tubing. The center conductor 38 may be coated with silver to increase its conductivity in order to reduce conduction losses, thereby allowing more current to be carried. Dielectric tubes 16 and 18 are mounted in coupling 12 so that the tubes are coaxially aligned with each other along axis a—a. In one embodiment, dielectric tubes 16 and 18 may be secured in coupling 12 with fasteners 23, such as bolts 23. Tubes 16 and 18 may be straight or tapered cylinders and made from a dielectric material such as fiberglass, or from an electrically insulating material such as porcelain. As shown in FIG. 2, an optional shed 25, which may be made of polysilicon rubber, may be positioned around dielectric tube 16 in order to increase the electrical discharge path to ground of bushing 10. For radio frequency applications, the dielectric material from which tubes 16 and 18 may be made of a material having a low loss tangent to minimize dielectric heating of tubes 16 and 18. In the operation of bushing 10, surface 27 of coupling 12 may adjoin a roof or wall of a building (not shown).

Figure 3:
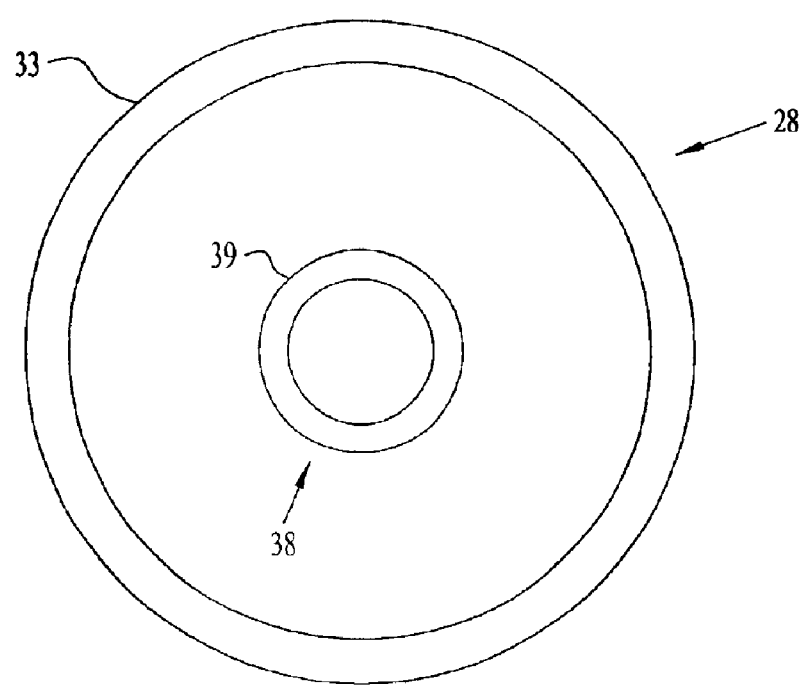
FIG. 3 is a cross-sectional view of the ground shield and center conductor.

An electrically conductive internal ground shield 28 is mounted within a generally circular aperture 14 of coupling 12 so that the shield 28 is substantially concentric with center conductor 38 and dielectric tubes 16 and 18. The ground shield 28 has a generally circular cross-sectional area, as shown in FIG. 3, and an inwardly profiled end 30 that moderates and thereby reduces the maximum electric field on the exterior surface of dielectric tube 16 that is exposed to the weather. The ground shield 28, thereby increases the voltage rating of bushing 10. The maximum value of the external surface electric field of bushing 10 is a function of the length of the ground shield 28. An optimum length for ground shield 28 may be determined, as for example, empirically or by using a computer program such as ELECTRO®, by Integrated Engineering Software. Inwardly profiled end 30 extends from nearest portion 31 of the outer generally diametrical surface 33 of ground shield 28 and has a progressively smaller, generally circular cross-sectional area as ground shield 28 transitions from a maximum diameter $D_m$ to a generally circular aperture 32 of ground shield 28. In one embodiment, inwardly profiled end 30 has a continuous outer surface, i.e., a surface having no discontinuities, and a taper angle $\alpha$ of about 30° with respect to the longitudinal axis a—a of bushing 10. In another embodiment, inwardly profiled end 30 may have a smoothly curved profile. Ground shield 28 also has a generally circular aperture 34 at end 37 opposite to and generally coaxially aligned with aperture 32 along axis a—a. Center conductor 38 extends through apertures 32 and 34. The inwardly profiled end 30 equalizes electric fields along the surface 19 of the dielectric tube 16 that would otherwise concentrate around the end of a ground shield that does not have an inwardly profiled end. In one embodiment, apertures 32 and 34 may have generally circular cross-sectional areas having mean diameters $D_2$ and $D_3$, respectively, where $D_2<D_3$. The phrase "inwardly profiled" refers to the fact that the diameter of aperture 32 is less than the maximum diameter $D_m$ of ground shield 28. The perimeter of apertures 32 and 34 are rimmed by electrically conductive tubing 35 and 36, respectively, so that there are no sharp edges or corners around the apertures. For example, tubing 35 and 36 may be made of copper, aluminum, other suitable electrically conductive material. In one embodiment, tubing 35 and 36 each may have a 1.5 inch outside diameter that provides rounded perimeters for apertures 32 and 34. The rounded perimeters of apertures 32 and 34 moderate or distribute an electric field better than would be achieved if the edges of the apertures were not rounded with a gentle radius. The distance between the rounded edges of apertures 32 and 34 provided by tubing 35 and 36, respectively, and the surface 39 of center conductor 38 are established so that the surface electric field on the inside of the bushing is below the acceptable design limits for the insulating medium selected and the voltage rating intended for bushing 10. By way of example, ground shield 28 may be made of an electrically conductive material such as copper, steel, or spun aluminum. Also, ground shield 28 may be made of a dielectric substrate on which a metal foil is formed. The surface electric field on the outside of the bushing 10 reduces (i.e., moderates) as the distance increases between the inwardly tapered end 30 of ground shield 28 and the dielectric tube 16. However, the field on the edge of the rounded shield increases as it is moved toward the high voltage center conductor. Thus, the position and radius of the curvature of the end of the grounded shield is a tradeoff between the breakdown limits on the inside and outside of the bushing 10. By way of example, exemplary dimensions of one embodiment of feed-through bushing 10 having a safe, wet operating voltage rating (i.e. no corona) in the range of about 150 kV RMS are provided in Table I below. End caps 20 and 24 are mounted at the ends 22 and 26, respectively of tubes 16 and 18 to provide a fluid tight (i.e., gas and/or liquid) seal there between. End caps 20 and 24 support center conductor 38 and are concentrically positioned around center conductor 38.

In order to increase the dielectric strength of bushing 10, interior volume 40 of bushing 10 contains or is filled with an insulating medium such as oil or a gas such as nitrogen (ND, sulfur hexaflouride ($SF_6$), or dry air. Sulfur hexaflouride provides the interior cavity 40 of bushing 10 with approximately 300% percent of the insulation value that would be obtained with the same volume of dry air.

Obviously, many modifications and variations of the high voltage bushing described herein are possible in light of the above teachings. It is therefore to be understood that within the scope of the appended claims, the high voltage bushing may be practiced otherwise than as specifically described.

TABLE 1

| Dimension | Description | Approximate Exemplary Length (inches) |
| --- | --- | --- |
| A | Length of bushing 10 | 214 |
| B | Inside diameter of tubes 16 and 18 | 24 |
| C | Diameter of center conductor 38 | 4 |
| $D_2$ | Diameter of aperture 32 | 10 |
| $D_3$ | Diameter of aperture 34 | 16.5 |
| E | Length of grounded shield 28 | 53 |
| F | Distance from mounting surface flange to end of ground shield 28 | 34 |

We claim:

1. A high voltage bushing, comprising:
   an electrically conductive coupling having an aperture;
   first and second dielectric tubes mounted to the coupling so that they are coaxially aligned and having first and second ends, respectively;
   first and second end plates mounted in a fluid tight manner to the first and second ends of the first and second dielectric tubes, respectively,
   an electrically conductive ground shield mounted in the aperture, and having an inwardly profiled end for moderating an electric field along the bushing, and having second and third apertures; and
   a center conductor that extends through the second and third apertures of the ground shield, and is mounted to the first and second end plates.

2. The high voltage bushing of claim 1 wherein the ground shield has a generally circular cross sectional area having a maximum outside diameter, the second and third apertures are coaxially aligned and have a mean diameter of $D_2$ and $D_3$, respectively, where $D_2<D_3$, and the inwardly profiled end extends from the maximum outside diameter to the third aperture.

3. The high voltage bushing of claim 1 further including a shed affixed to the first tube.

4. The high voltage bushing of claim 1 wherein the first and second tubes, and the coupler define an interior cavity that contains an electrically insulating medium.

5. The high voltage bushing of claim 4 wherein the electrically insulating medium is selected from the group that includes dry air, nitrogen, and sulfur hexafluoride.

6. The high voltage bushing of claim 3 wherein the inwardly profiled end has a continuous outer surface.

7. The high voltage bushing of claim 3 wherein the second and third apertures have rounded perimeters.

8. A high voltage bushing, comprising:

an electrically conductive coupling having an aperture;

first and second electrically insulating tubes mounted to the coupling so that they are coaxially aligned and having first and second ends, respectively, first and second end plates mounted in a fluid tight manner to the first and second ends of the first and second electrically insulating tubes, respectively;

an electrically conductive ground shield mounted in the aperture, and having an inwardly profiled end for moderating an electric field along the bushing, and having second and third apertures; and a center conductor that extends through the second and third apertures of the ground shield, and is mounted to the first and second end plates.

9. The high voltage bushing of claim 8 wherein the ground shield has a generally circular cross sectional area having a maximum outside diameter, the second and third apertures are coaxially aligned and have a mean diameter of $D_2$ and $D_3$, respectively, where $D_2<D_3$, and the inwardly profiled end extends from the maximum outside diameter to the third aperture.

10. The high voltage bushing of claim 8 further including a shed affixed to the first tube.

11. The high voltage bushing of claim 8 wherein the first and second tubes, and the coupler define an interior cavity that contains an electrically insulating medium.

12. The high voltage bushing of claim 11 wherein the electrically insulating medium is selected from the group that includes dry air, nitrogen, and sulfur hexafluoride.

13. The high voltage bushing of claim 10 wherein the inwardly profiled end has a continuous outer surface.

14. The high voltage bushing of claim 10 wherein the second and third apertures have rounded perimeters.

* * * * *